(12) United States Patent
Cao et al.

(10) Patent No.: US 11,997,957 B2
(45) Date of Patent: Jun. 4, 2024

(54) MULTIFUNCTIONAL ROBOTIC DEVICE

(71) Applicant: Globe (Jiangsu) Co., Ltd, Jiangsu (CN)

(72) Inventors: Jin Cao, Jiangsu (CN); Jie Gao, Jiangsu (CN); Wanghao Li, Jiangsu (CN)

(73) Assignee: Globe (Jiangsu) Co., Ltd, Changzhou (CN)

( * ) Notice: Subject to any disclaimer, the term of this patent is extended or adjusted under 35 U.S.C. 154(b) by 927 days.

(21) Appl. No.: 17/026,726

(22) Filed: Sep. 21, 2020

(65) Prior Publication Data

US 2021/0084842 A1 Mar. 25, 2021

(30) Foreign Application Priority Data

Sep. 19, 2019 (CN) .......................... 201910884229.9

(51) Int. Cl.
| | | |
|---|---|---|
| *A01G 20/43* | (2018.01) | |
| *A01D 34/00* | (2006.01) | |
| *A01D 101/00* | (2006.01) | |
| *A01G 20/47* | (2018.01) | |
| *A47L 11/14* | (2006.01) | |
| *A47L 11/24* | (2006.01) | |
| *A47L 11/40* | (2006.01) | |
| *B24B 37/20* | (2012.01) | |
| *B60K 1/04* | (2019.01) | |
| *B60K 17/04* | (2006.01) | |
| *E01H 1/04* | (2006.01) | |
| *E01H 1/05* | (2006.01) | |
| *F16H 1/22* | (2006.01) | |
| *A47L 9/06* | (2006.01) | |

(52) U.S. Cl.
CPC ........... *A01G 20/43* (2018.02); *A01D 34/008* (2013.01); *A01G 20/47* (2018.02); *A47L 11/14* (2013.01); *A47L 11/24* (2013.01); *A47L 11/4036* (2013.01); *A47L 11/4066* (2013.01); *B24B 37/20* (2013.01); *B60K 1/04* (2013.01); *B60K 17/04* (2013.01); *E01H 1/04* (2013.01); *E01H 1/053* (2013.01); *A01D 2101/00* (2013.01); *A47L 9/0673* (2013.01); *A47L 2201/00* (2013.01); *F16H 1/22* (2013.01)

(58) Field of Classification Search
CPC .......................... A47L 2201/00; A47L 9/0673
See application file for complete search history.

(56) References Cited

U.S. PATENT DOCUMENTS

| | | | | |
|---|---|---|---|---|
| 2002/0156556 | A1* | 10/2002 | Ruffner ..................... | G01S 5/12 318/587 |
| 2017/0361456 | A1 | 12/2017 | He et al. | |
| 2019/0022854 | A1 | 1/2019 | Hackert et al. | |

FOREIGN PATENT DOCUMENTS

| | | |
|---|---|---|
| DE | 212015000289 U1 | 7/2017 |
| DE | 112017005858 T5 | 8/2019 |
| EP | 3238522 A1 | 11/2017 |

* cited by examiner

*Primary Examiner* — Andrew A Horton

(57) ABSTRACT

The application provides a multifunctional robotic device including a body, an energy unit installed in the body, a power unit powered by the energy unit, the power unit including an output shaft wherein the output shaft is located at the lower part of the body and exposed from the body, and at least two working units, the working unit is detachably connected to output shaft of the power unit and driven by the power unit.

12 Claims, 5 Drawing Sheets

MULTIFUNCTIONAL ROBOTIC DEVICE

CROSS-REFERENCE TO RELATED APPLICATION

This application is based upon and claims the benefit of priority from the prior Chinese Patent Application No. 201910884229.9, filed on Sep. 19, 2019, the entire contents of which are incorporated herein by reference.

TECHNICAL FIELD

The invention relates to a power tool, in particular to a multifunctional robotic device.

BACKGROUND ART

With the improvement of the power tool, lawn mowers, sweepers and polishing machines have become more and more widely used.

mowers are mainly used in the field of cutting grass. Sweepers are used in public places such as roads. The polishing machine is suitable for grinding, polishing and waxing in various places.

However, the mower is not always in use because it takes time for the grass to grow. The cleaning and polishing task are also periodic or random, and those tasks are all simple and boring. The customers have to purchase multiple power tools for different tasks, such as sweepers and polishing machines. Multiple power tools can cause high maintenance costs and take up space to store.

It is necessary to provide a multifunctional robotic device to solve the mentioned problems.

SUMMARY OF INVENTION

The object of the present invention is to provide a multifunctional robotic device with mowing, sweeping and polishing function.

A multifunctional robotic device includes a body, an energy unit installed in the body, a power unit powered by the energy unit, the power unit including an output shaft wherein the output shaft is located at the lower part of the body and exposed from the body, and at least two working units, wherein the working unit is detachably connected to output shaft of the power unit and driven by the power unit.

According to one example embodiment, the working unit comprises a mowing unit, a sweeping unit or a polishing unit, and the sweeping unit or the polishing unit is connected with the power unit by replacing the mowing unit, thereby the mowing state, the sweeping state and the polishing state can be switchable.

According to another example embodiment, the mowing unit comprises a cutting plate connected to the output shaft and a cutting blade mounted on the cutting plate.

According to another example embodiment, the sweeping unit includes a first sweeping assembly, and the first sweeping assembly includes a cutting plate shared with the mowing unit and at least two first sweeping brushes mounted on the cutting plate, the size of the first sweeping brush is smaller than that of the cutting plate, only the cutting blade and the first sweeping brushes being replaced with each other when switching between the mowing state and the sweeping state.

According to another example embodiment, the sweeping unit comprises a second sweeping assembly, the second sweeping assembly includes a second sweeping brush connected to the output shaft, and the size of the second sweeping brush is not smaller than that of the cutting plate, the cutting blade and the second sweeping brush being replaced with each other when switching between the mowing state and the sweeping state.

According to another example embodiment, the sweeping unit includes a third sweeping assembly, the third sweeping assembly includes a transmission unit and a plurality of third sweeping brushes, and the transmission unit includes a housing, a main gear located in the housing and connected to the output shaft, and a plurality of driven gears located on opposite sides of the main gear and meshing with the main gear, the third sweeping brushes being coaxially arranged with the driven gears and driven by the driven gears.

According to another example embodiment, the multifunctional robotic device further comprises a dust collecting device, and when the number of the third sweeping brushes is an even number, the dust collecting port of the dust collecting device is located between the third sweeping brushes on opposite sides, the third sweeping brushes on opposite sides rotate in opposite directions.

According to another example embodiment, the sweeping unit comprises a first sweeping assembly, a second sweeping assembly, and a third sweeping assembly, and the three sweeping assemblies have different numbers of sweeping brushes.

According to another example embodiment, the polishing unit includes a first polishing assembly, and the first polishing assembly includes a cutting plate shared with the mowing unit and at least two first polishing pads mounted on the cutting plate, the size of the first polishing pad is smaller than that of the cutting plate, only the cutting blade and the first polishing pad being replaced with each other when switching between the mowing state and the polishing state.

According to another example embodiment, the polishing unit comprises a second polishing assembly, the second polishing assembly includes a second polishing pad connected to the output shaft, and the size of the second polishing pad is not less than that of the cutting plate, only the cutting blade and the second polishing pad being replaced with each other when switching between the mowing state and the polishing state.

According to another example embodiment, the polishing unit comprises a first polishing assembly and a second polishing assembly, and the two polishing assemblies have different numbers of polishing pads.

According to another example embodiment, the multifunctional robotic device further comprises a driving wheel and a driven wheel mounted on the body, and a manual control device that controls the multifunctional robotic device to turn, walk, Mowing, sweeping or polishing work.

This invention is by replacing the mowing unit with a sweeping unit or a polishing unit, and it is detachably mounted on the body and driven by the output shaft, so that the multifunctional robotic device can be switched between the mowing state, the sweeping state and the polishing state, which can save cost, be easy to use and more robotic.

DESCRIPTION OF EMBODIMENT

Figure 1:
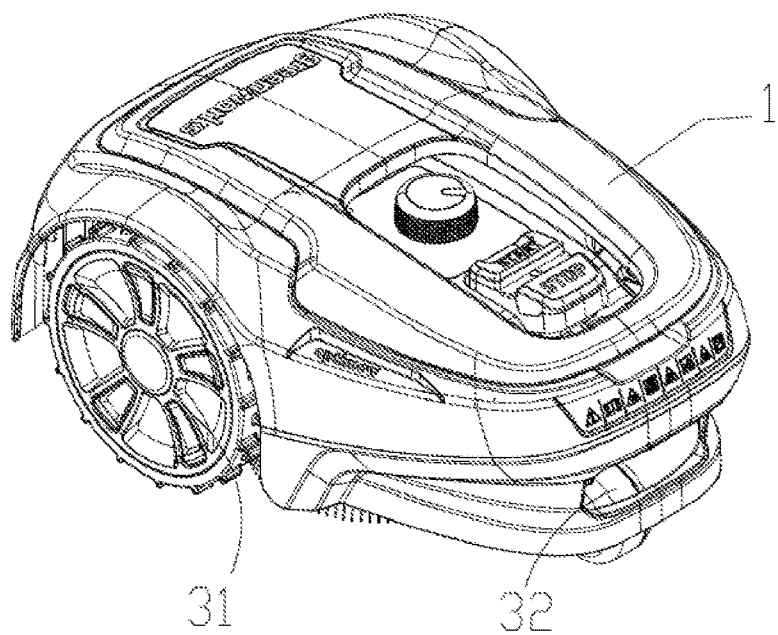
FIG. 1 is a perspective view of a multifunctional robotic device according to an embodiment of the present invention.

In order to make the objectives, technical solutions, and advantages of the present invention clearer, the following describes the present invention in detail with reference to the accompanying drawings and specific embodiment.

With reference to FIGS. 1 to 8, an embodiment of multifunctional robotic device is provided, the multifunctional robotic device of the present invention includes a body 1, an energy unit (not shown) installed in the body 1, a power unit (not shown) powered by the energy unit, and a working unit driven by the power unit. There are multiple types of working units 2, and the working units 2 with different functions can be detachably mounted on the robotic device. In an embodiment of the present application, the working unit 2 has three types of working device which can be used for cutting, sweeping, and polishing. The working unit 2 can be interchangeably mounted on the robotic device. The multifunctional robotic device can perform different maintenance work, which can save costs, facilitate use, and is more intelligent. It can be understood that the three functions provided in the embodiment of the present application are not limited for protecting scope. The working unit 2 with other functions may also be within the scope of the present application. The energy unit is preferably a battery pack, which is an existing structure and will not be described herein.

The power unit is a driving motor, which includes an output shaft (not shown) assembled with the working unit 2. The output shaft is located at the lower part of the body 1 and exposed from the body 1.

There are at least two working units 2. In one embodiment of the present application, the working unit 2 could be one of a mowing unit 21, a sweeping unit 22, and a polishing unit (not shown). The sweeping unit 22 or the polishing unit can be detachably installed on the main body 1 by replacing the mowing unit 21 and driven by the output shaft, so that the multifunctional robotic device can be switched between the mowing state, the sweeping state or the polishing state.

Figure 2:
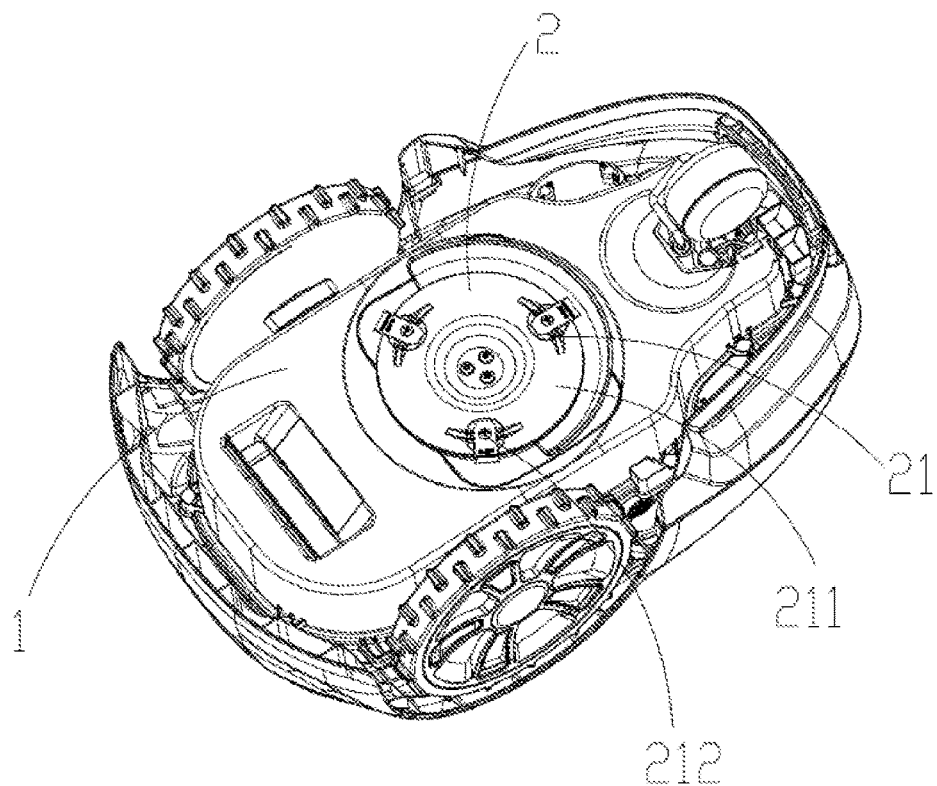
FIG. 2 is a perspective view of a lawn mower mounted on the multifunctional robotic device according to an embodiment of the present invention.

As shown in FIG. 2, when the multifunctional robotic device is in a mowing state, the multifunctional robotic device includes a body 1, an energy unit, a power unit, and a mowing unit 21. Specifically, the mowing unit 21 includes a cutting plate 211 connected to the output shaft and a cutting blade 212 mounted on the cutting plate 211. The cutting plate 211 is preferably disc-shaped, and three cutting blades 212 are arranged at the same interval along the edge of the cutting plate 211, and the cutting blades 212 can be fixed on the cutting plate 211 by screws.

As shown in FIG. 3 to FIG. 8, when the multifunctional robotic device is switched to the sweeping state, the multifunctional robotic device includes a body 1, an energy unit, a power unit, and a sweeping unit 22. Specifically, the sweeping unit 22 has three forms of cleaning assembly, a first sweeping assembly 22a, a second sweeping assembly 22b, and a third sweeping assembly 22c. The three sweeping assemblies have sweeping brushes with different numbers and structures, which are mainly used to perform different sweeping tasks. It can be understood that the sweeping unit of the multifunctional robotic device of the present invention is not limited to the above three types, which may include one or more sweeping assemblies.

Figure 3:
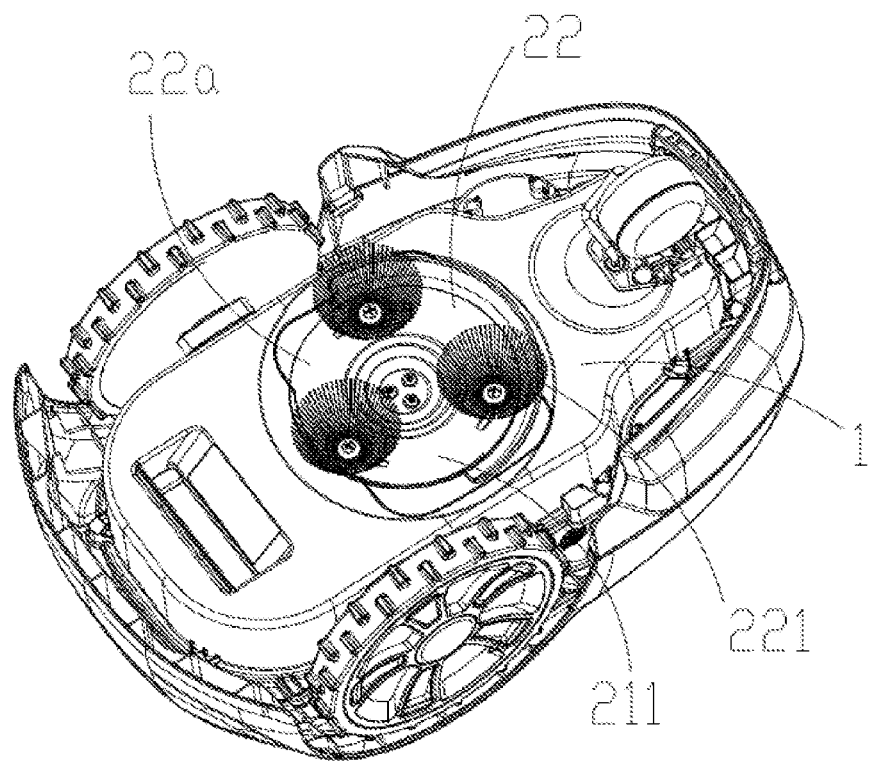
FIG. 3 is a perspective view of a first sweeping assembly mounted on the multifunctional robotic device of the present invention.
Figure 4:
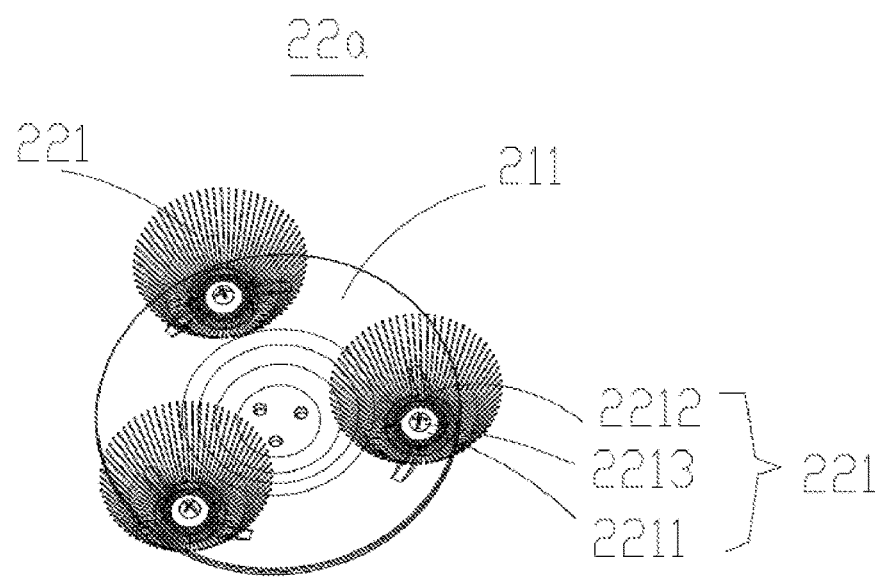
FIG. 4 is a perspective view of the first sweeping assembly in FIG. 3.

Please refer to FIG. 3 and FIG. 4, which show installing the first sweeping unit 22a to the power unit of robotic device. The first sweeping unit 22a includes a cutting plate 211 and a first weeping brush 221 mounted on the cutting plate 211. The first sweeping assembly 22a shares the cutting plate 211 with the mowing unit 21. With this design, the first sweeping brush 221 can be directly installed on the cutting plate 211 without replacing any component. The number of the first sweeping brush 221 is at least two and the size is smaller than the size of the cutting plate 211. In FIG. 3 and FIG. 4, the number of the first sweeping brushes 221 are three and their sizes are smaller than that of the cutting plate 211, which are mainly used for sweeping small particles such as debris and little stones.

Specifically, the first sweeping brush 221 includes a circular plate 2211 and a plurality of flexible sweeping ropes 2212 located around the circular plate 2211. A fixing hole (not shown) is located in the center of the circular plate 2211, and the first sweeping brush 221 can be fixed on the cutting plate 211 through the fixing hole via the bolt 2213.

When switching between the mowing state and the sweeping state, the first sweeping assembly 22a only needs to replace the cutting blade 212 and the first sweeping brush 221 with each other to realize the sweeping function. During sweeping, the rotation of the cutting plate 211 drives the first sweeping brush 221 to rotate around the axis of the driving motor, thereby sweeping the debris on the road surface to the curb. In order to enhance the universal adaptability, the bolts 2213 and the fixing bolts of the cutting blade 212 are the same bolts.

Figure 5:
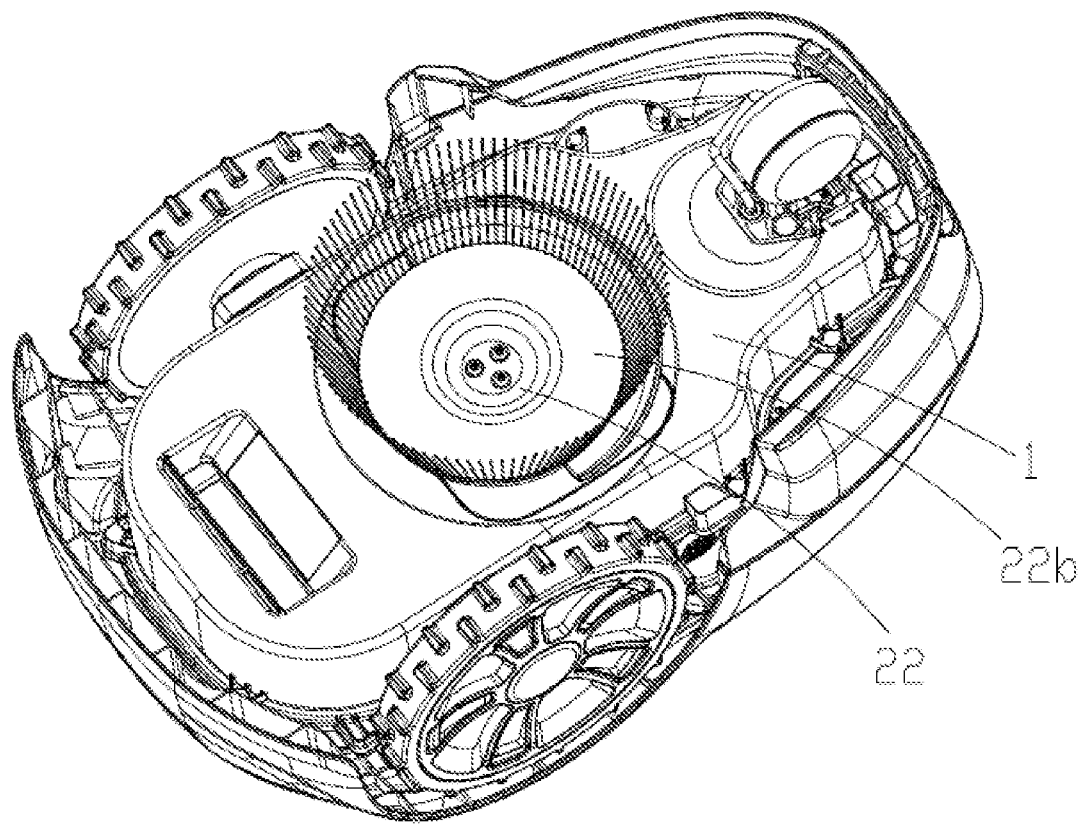
FIG. 5 is a perspective view of a second sweeping assembly mounted on the multifunctional robotic device of the present invention.
Figure 6:
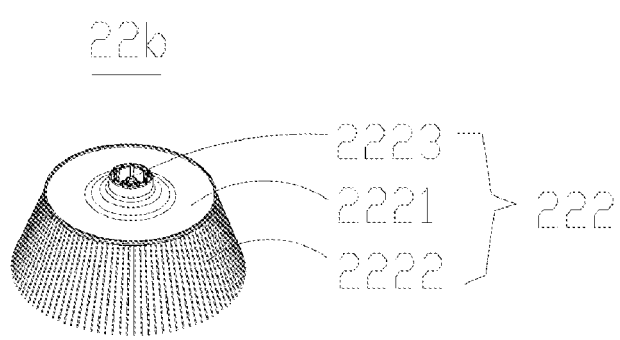
FIG. 6 is a perspective view of the second sweeping assembly in FIG. 5.

FIG. 5 and FIG. 6 show the mowing unit 21 which is replaced with the second sweeping assembly 22b and installed on the power unit. The second sweeping assembly 22b includes a second sweeping brush 222 connected to the output shaft. The size of the second sweeping brush 222 is similar as that of the cutting plate 211. Because the size of the second sweeping brush 222 is large, it can not only sweep debris such as debris, stones, etc., but also replace snow sweeper to clean snow.

Specifically, the second sweeping brush 222 includes a circular plate 2221 and a plurality of flexible sweeping ropes 2222 located around the circular plate 2221. The circular plate 2221 is provided with an interface 2223 connected to the output shaft of motor, through which the second sweeping brush 222 and the output shaft of motor can be fixed.

When switching between the mowing state and the sweeping state, it is only necessary to replace the cutting plate 211 and the second sweeping brush 222 with each other. During sweeping, the rotation of the output shaft drives the second sweeping brush 222 to rotate around the axis of the driving motor, thereby sweeping the debris on the road surface to the side of the road.

Figure 7:
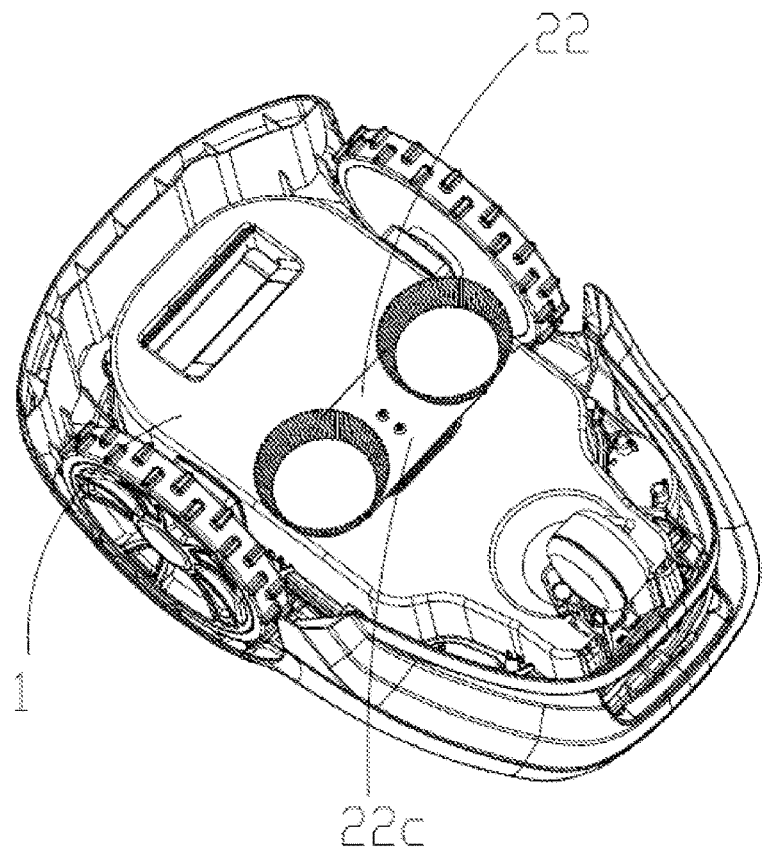
FIG. 7 is a perspective view of a third sweeping assembly installed on the multifunctional robotic device of the present invention.
Figure 8:
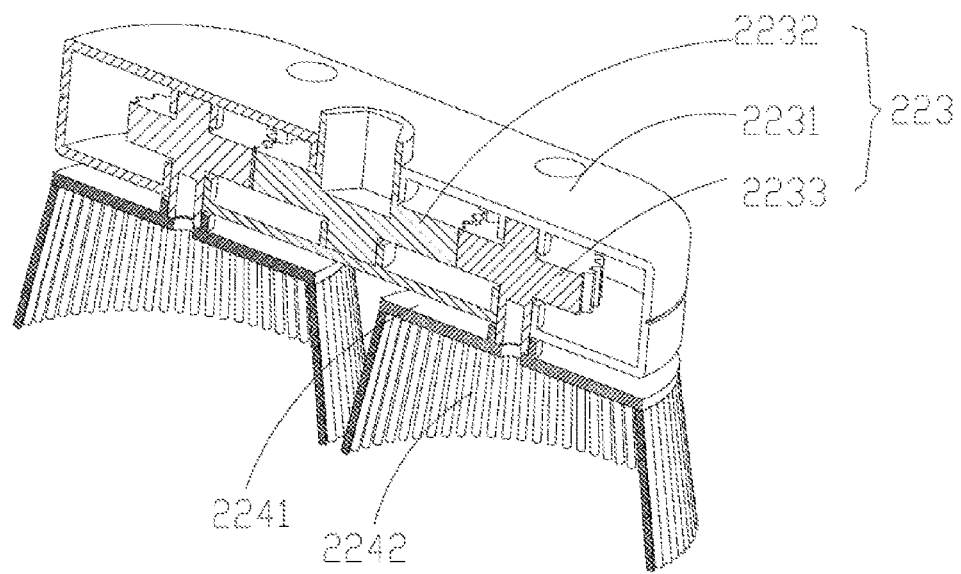
FIG. 8 is a perspective sectional view of the third sweeping assembly in FIG. 7.
Figure 9:
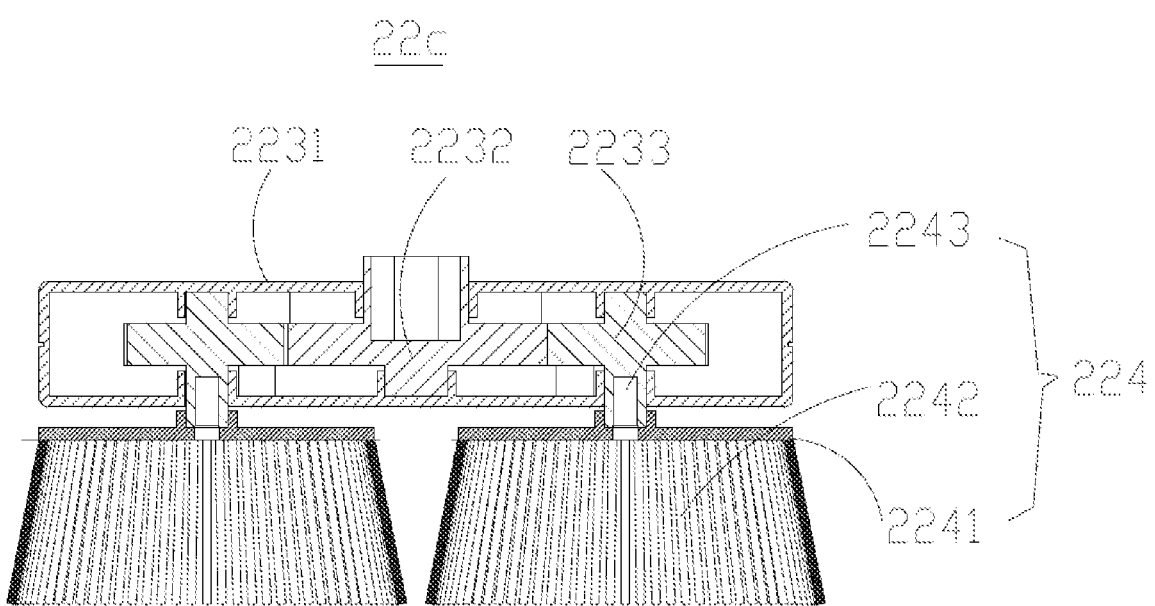
FIG. 9 is a cross-sectional view of the third sweeping assembly in FIG. 7.

FIG. 7, FIG. 8, and FIG. 9 show the third sweeping assembly 22c which replaces the mowing unit 21 and installed on the power unit. The third sweeping assembly 22c includes a transmission unit 223 and a plurality of third sweeping brush 224. The transmission assembly 223 includes a housing 2231, a main gear 2232 located in the housing 2231 and connected to the output shaft, and a plurality of driven gears 2233 located on opposite sides of the main gear 2232 and meshed with the main gear 2232. In other embodiment of present invention, the driven gears 2233 can be located on one side of the main gear 2232 and meshed with the main gear 2232. The main gear 2232 is aligned in line with the driven gear 2233. The output shaft drives the main gear 2232 at the middle to rotate. The main gear 2232 drives the driven gears 2233 on both sides to rotate in opposite directions.

Specifically, the third sweeping brush 224 includes a circular plate 2241 and a plurality of flexible sweeping ropes 2242 located around the circular plate 2241. The center part of the circular plate 2241 is provided with a fixing hole (not shown), and the third sweeping brush 224 can be fixed on the corresponding driven gear 2233 through the fixing hole by the bolt 2243. The third sweeping brush 224 is coaxially arranged with the driving gear 2233 and rotates driven by the driven gear 2233.

When the number of the third sweeping brush 224 is an even number, the third sweeping brush 224 on both sides can be rotated inwardly, that is, the third sweeping brush 224 on one side is rotated clockwise and the third sweeping brush 224 on the other side is rotated anticlockwise. On this basis, the multifunctional robotic device further includes a dust collecting device (not shown), the dust collecting device is located at the rear part of the multifunctional robotic device. The dust collecting device have a dust collecting port which is located between the third sweeping brush 224 on both sides. The third sweeping brushes 224 on both sides are rotated in opposite directions, so that debris, stones, and other debris are concentrated between the third sweeping brushes 224 on both sides, which is convenient for the dust collecting port to absorb debris. In addition, when the number of the third sweeping brush 224 is an odd number, the debris can be swept to the side of the road.

When the multifunctional robotic device is switched to the polishing state, the multifunctional robotic device includes a body 1, an energy unit, a power unit, and a polishing unit. Since the polishing unit (such as a common floor sanding device) is a commonly used device, it is not illustrated in this application. Specifically, the polishing unit includes a first polishing assembly and a second polishing assembly. The two polishing assemblies have polishing pads with different numbers and structures, which are mainly used to perform different polishing tasks. It can be understood that the polishing assemblies of the multifunctional robotic device of the present invention are not limited to the above two types, and the number of the polishing assemblies may also be one or more.

When the first polishing assembly replaces the mowing unit 21 and is mounted to the power unit, the first polishing assembly includes a cutting plate 211 and a first polishing pad mounted on the cutting plate 211. The first polishing assembly shares the cutting plate 211 with the mowing unit 21. With this design, the first polishing pad can be directly mounted on the cutting plate 211 without other replacing the component, and the installation is convenient. The number of the first polishing pad is at least two and its size is smaller than that of the cutting plate 211, which is mainly used for fine grinding and polishing. In addition, the first polishing pad is fixed to the cutting plate 211 by a bolt.

When switching between the mowing state and the polishing state, the first polishing assembly only needs to replace the cutting blade 212 and the first polishing pad with each other to realize the polishing function. During polishing, the rotation of the cutting plate 211 drives the first polishing pad to rotate around the axis of the driving motor, thereby achieving fine grinding and polishing.

When the second polishing assembly replaces the mowing unit 21 to the power unit, the second polishing assembly includes a second polishing pad connected to the output shaft. The number of the second polishing pad is one and its size is not less than that of the cutting plate 211. Since the size of the second polishing pad is large, it is mainly used for grinding with a large margin.

When switching between the mowing state and the sweeping state, it is only necessary to replace the cutting plate 211 and the second polishing pad with each other. During polishing, the rotation of the output shaft drives the second polishing plate to rotate around the axis of the driving motor, thereby achieving large margin grinding.

As shown in FIG. 1, the multifunctional robotic device further includes a driving wheel 31 and a driven wheel 32 mounted on the body 1. In order to make the operation of the multifunctional robotic device more diverse, it also includes a manual control device (not shown) for controlling the driving wheel 31 and the driven wheel 32, such as a smart phone. The manual control device is wirelessly connected with the multifunctional robotic device. For example, WIFI, Bluetooth and other methods. The manual control device can control the multifunctional robotic device to perform turning, walking, mowing, sweeping or polishing.

In summary, the present invention provides a multifunctional robotic device, which includes a body 1, an energy unit installed in the body 1, a power unit powered by the energy unit, and a working unit 2 driven by the power unit. The working unit 2 could be one of mowing unit 21, sweeping unit 22 or polishing unit. When the working unit 2 is a mowing unit, the robotic device is a robotic mower. When the working unit 2 is a sweeping unit, the robotic device is a robotic sweeper. When the working unit 2 is a polishing unit, the robotic device is a robotic polisher. The consumers can only buy one robotic device with multiple work units to achieve multiple functions.

Terms such as "upper", "lower", "left", "right", "front", "rear", etc., used to indicate spatial relative positions are described for the purpose of explaining the relationship of one feature to another as shown in the accompanying drawings. It can be understood that, according to different product placement positions, the terms of spatial relative positions may be intended to include different positions other than the positions shown in the drawings, and should not be construed as limiting the claims. In addition, the descriptive word "horizontal" used herein is not completely equivalent to allowing a certain angle of tilt along the direction perpendicular to gravity.

In addition, the above embodiment is only used to illustrate the present invention and not to limit the technical solutions described in the present invention. The understanding of this specification should be based on those skilled in the art, although this specification has given a detailed description of the present invention with reference to the above-mentioned embodiment. However, those of ordinary skill in the art should understand that those skilled in the art can still modify or equivalently replace the present invention, and all technical solutions and improvements without departing from the spirit and scope of the present invention should be encompassed within the scope of the claims of the present invention.

The invention claimed is:

1. A multifunctional robotic device comprising:
a body;
an energy unit installed in the body;
a power unit powered by the energy unit, the power unit including an output shaft wherein the output shaft is located at a lower part of the body and exposed downwardly from the body;
and at least two working units, wherein the working units are interchangeably mountable to the output shaft of the power unit and the output shaft is drivable by the power unit.

2. The multifunctional robotic device according to claim 1, wherein the working units are comprised in a group consisting of a mowing unit, a sweeping unit or a polishing unit, the mowing unit is interchangeable with the sweeping unit or the polishing unit to realize the corresponding functions.

3. The multifunctional robotic device according to claim 2, wherein the mowing unit comprises a cutting plate connected to the output shaft and a cutting blade mounted on the cutting plate.

4. The multifunctional robotic device according to claim 3, wherein the sweeping unit includes a first sweeping assembly, and the first sweeping assembly includes a cutting plate shared with the mowing unit and at least two first sweeping brushes mounted on the cutting plate.

5. The multifunctional robotic device according to claim 3, wherein the sweeping unit comprises a second sweeping assembly, the second sweeping assembly includes a second sweeping brush connected to the output shaft.

6. The multifunctional robotic device according to claim 5, wherein the sweeping unit includes a third sweeping assembly, the third sweeping assembly includes a transmission unit and a plurality of third sweeping brushes, and the transmission unit includes a housing, a main gear located in the housing and connected to the output shaft, and a plurality of driven gears connected to the main gear, the third sweeping brushes being coaxially arranged with the driven gears and driven by the driven gears.

7. The multifunctional robotic device according to claim 6, further comprises a dust collecting device, the dust collecting device is located at a rear part of the multifunctional robotic device.

8. The multifunctional robotic device according to claim 3, wherein the sweeping unit comprises a first sweeping assembly, a second sweeping assembly, and a third sweeping assembly, and the three sweeping assemblies have different numbers of sweeping brushes.

9. The multifunctional robotic device according to claim 3, wherein the polishing unit includes a first polishing assembly, and the first polishing assembly includes a cutting plate shared with the mowing unit and at least two first polishing pads mounted on the cutting plate, the size of the at least two first polishing pads is smaller than that of the cutting plate, first polishing brushes are used to replace the cutting blade to realize the polishing functions.

10. The multifunctional robotic device according to claim 9, wherein the polishing unit comprises a second polishing assembly, the second polishing assembly includes a second polishing pad connected to the output shaft, and the size of the second polishing pad is similar as that of the cutting plate, second polishing brushes are used to replace the cutting plate to realize the polishing functions.

11. The multifunctional robotic device according to claim 3, wherein the polishing unit comprises a first polishing assembly and a second polishing assembly, and the two polishing assemblies have different numbers of polishing pads.

12. The multifunctional robotic device according to claim 1, further comprises a driving wheel and a driven wheel mounted on the body, and a manual control device that controls the multifunctional robotic device.

* * * * *